United States Patent [19]

Fox

[11] Patent Number: 4,797,570
[45] Date of Patent: Jan. 10, 1989

[54] AUTOMATIC PARALLELING OF AC POWER SOURCES

[75] Inventor: David A. Fox, Shawnee Township, Allen County, Ohio

[73] Assignee: Westinghouse Electric Corp., Pittsburgh, Pa.

[21] Appl. No.: 80,031

[22] Filed: Jul. 31, 1987

[51] Int. Cl.$^4$ ............................................. H02J 3/00
[52] U.S. Cl. ....................................... 307/87; 307/57; 307/31; 361/90; 361/91; 361/92
[58] Field of Search ................ 307/51, 52, 57, 58, 307/64, 66, 85, 86, 87, 84; 361/89, 90, 91, 92, 93

[56] References Cited

U.S. PATENT DOCUMENTS

| | | |
|---|---|---|
| 2,862,111 | 11/1958 | Richards, Jr. et al. |
| 3,069,555 | 12/1962 | Kessler ............................. 307/57 X |
| 3,069,556 | 12/1962 | Apfelbeck et al. |
| 3,210,556 | 10/1965 | Billings . |
| 3,444,387 | 5/1969 | Billings et al. |
| 3,539,820 | 11/1970 | Kessler ............................ 307/87 |
| 3,588,519 | 6/1971 | Luebrecht . |
| 3,683,199 | 8/1972 | Billings et al. ............... 307/57 X |
| 3,749,944 | 7/1973 | Luebrecht ...................... 361/92 X |
| 3,940,664 | 2/1976 | Matsko ............................... 361/92 |
| 4,144,551 | 3/1979 | Smith et al. ................. 307/31 X |
| 4,583,004 | 4/1986 | Yearsin ............................ 307/87 |

Primary Examiner—William M. Shoop, Jr.
Assistant Examiner—Paul Ip
Attorney, Agent, or Firm—R. P. Plenart

[57] ABSTRACT

A system for effecting parallel operation of a pair of AC power sources includes a monitoring circuit for monitoring the difference voltage occurring between output voltages on corresponding phases of the power sources. A capacitor is connected to a charging circuit and to an output of the monitoring circuit. When the difference voltage occurring between the output voltages on corresponding phases of the power sources exceeds a predetermined threshold level, the capacitor is shorted. Paralleling of the power sources is inhibited when the capacitor voltage is below a second predetermined threshold level.

4 Claims, 2 Drawing Sheets

AUTOMATIC PARALLELING OF AC POWER SOURCES

BACKGROUND OF THE INVENTION

This invention relates to circuits and methods for controlling electrical power systems and, more particularly, to such circuits and methods which control the paralleling of alternating current power sources such that the paralleling connection is made when the requirements of synchronism are met.

When alternating current power sources, such as generators or inverters, are to be operated in parallel, the sources must be close to synchronism with each other when they are connected together, or when an incoming power source is connected to a line or bus to which other power sources are already connected. This means that the voltage, frequency and phase angle of the incoming power source and of the line must be close to the same values, within predetermined limits, in order to prevent excessive system transients, and so that the incoming source can be pulled into synchronism with the line.

When AC power sources are provided with control means or regulators which hold the frequency and voltage of the outputs close to desired values, paralleling can be accomplished by providing sensing means for sensing the frequency and phase angle differences between the incoming source and the energized line. The output of the sensing means then controls a circuit breaker of the incoming source to cause the breaker to close at the correct instant when the incoming source is sufficiently close to synchronism with the energized line.

Auto paralleling circuits are designed to monitor the phase angle and voltage synchronization of electrical systems which are to be paralleled. Voltage matching of the power sources is usually assumed to be controlled adequately by individual source voltage regulators. The phase angle and slip frequency must be monitored to be within specified limits before the paralleling contactor can be closed.

Numerous examples of automatic paralleling circuits can be found in the prior art. Such circuits are disclosed in U.S. Pat. Nos. 2,862,111; 3,069,556; 3,210,556; 3,444,387; and 3,588,519.

SUMMARY OF THE INVENTION

The present invention provides a relatively simple auto paralleling circuit for use in controlling the paralleling of alternating current power sources in which the limits for allowable slip frequency at the time of paralleling can be easily controlled and which responds to sudden large phase errors such as those that occur between the power sources when loads are applied or removed just before the paralleling contactor is closed. A paralleling system constructed in accordance with this invention includes a monitoring circuit which monitors the difference voltage occurring between output voltages on corresponding phases of a pair of alternating current electrical power sources. A capacitor is connected to an output of the monitoring circuit and is provided with a charging circuit. The monitoring circuit operates to short the capacitor when the difference voltage occurring between the monitored output voltages exceeds a predetermined threshold level. A control device for effecting the electrical connection of the outputs of the power sources responds to the capacitor voltage and is inhibited when the voltage on the capacitor is below a second predetermined threshold level.

The system of this invention operates in accordance with a method for effecting paralleling operation of a pair of alternating current electrical power sources wherein the difference voltage occurring between output voltages on corresponding phases of the power sources is monitored while a capacitor is being charged. If the monitored voltage difference exceeds a predetermined threshold level, the capacitor is shorted and the electrical connection of the outputs of the power sources is inhibited until the voltage on the capacitor reaches a second predetermined threshold level.

DESCRIPTION OF THE PREFERRED EMBODIMENT

Figure 1:
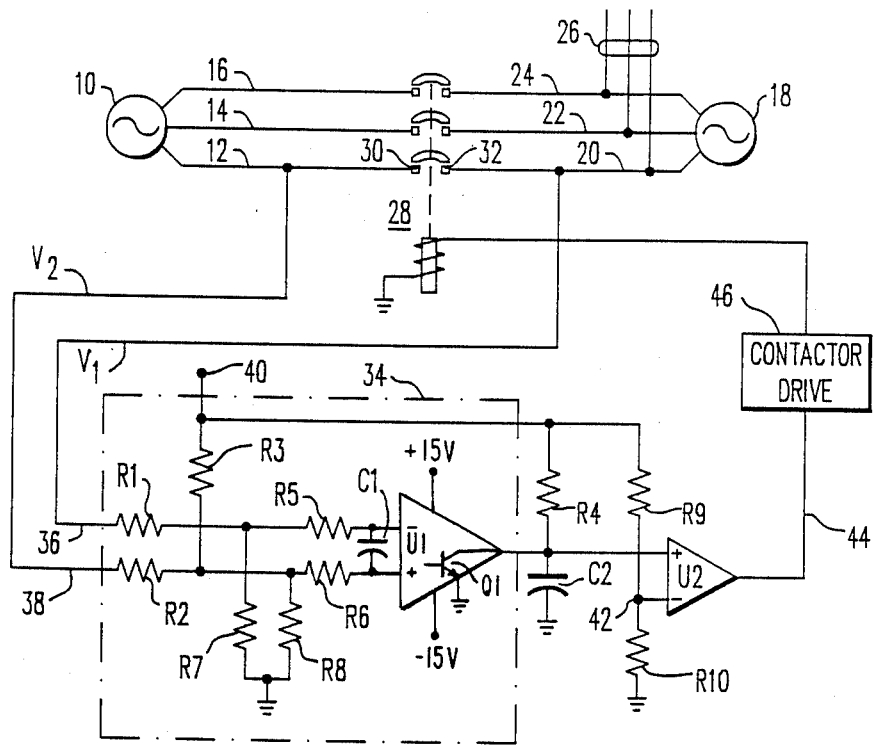
FIG. 1 is a schematic diagram of a parallel AC electrical power system having an automatic paralleling system constructed in accordance with one embodiment of the present invention.

Referring to the drawings, FIG. 1 is a schematic diagram of an alternating current electrical system having an automatic paralleling system constructed in accordance with the present invention. The electrical system includes a first AC power source 10, which may be, for example, a generator or inverter, having three output phases 12, 14, 16. A second AC power source 18 has three output phases 20, 22, 24 which are connected to a main power bus 26. A contactor 28 is used to electrically connect the outputs of the AC power sources 10 and 18, by shorting contacts, for example 30 and 32, connected to corresponding phases of the AC power sources.

The automatic paralleling circuit of the system of FIG. 1 includes a monitoring circuit 34 comprising resistors R1, R2, R3, R5, R6, R7, R8, capacitor C1, and comparator U1. These components are connected to form a differential comparator having three inputs. A first input 36 is connected to receive the voltage $V_1$ appearing on phase 20 of power source 18 and a second input 38 is connected to receive a voltage $V_2$ appearing on phase 12 of power source 10. The third input 40 receives a DC voltage which is used to charge a capacitor C2 through resistor R4 and to establish the threshold voltage levels necessary for operation of the circuit. When the difference between voltages $V_1$, $V_2$ exceeds a first predetermined threshold voltage $V_{th1}$ set by the voltage appearing on input 40, the output of comparator U1 switches from a logic high level to a logic low level. Since the output of comparator U1 is an open collector circuit, by switching to a logic low output, it serves to short capacitor C2. A second comparator U2 compares the voltage on capacitor C2 to a voltage at point 42 on a resistive voltage divider formed by resistors R9, R10. When the voltage on capacitor C2 exceeds the voltage at point 42, a paralleling signal is delivered on line 44 to a contactor drive circuit 46, thereby causing the actuation of contactor 28 and the resulting paralleling of the AC power sources.

Table I lists the components which may be used to construct the automatic paralleling circuit of FIG. 1.

TABLE I

| Components Used in FIG. 1 | |
|---|---|
| Item | Value |
| R1, R2 | 249 kΩ |
| R3 | 750 kΩ |
| R4 | 34 kΩ |
| R5, R6, R9, R10 | 10 kΩ |
| R7, R8 | 4.99 kΩ |
| C1 | 0.1 μfd |
| C2 | 4.7 μfd |
| U1, U2 | LM111 |

The first threshold voltage established by the DC voltage level on input 40 can be found by assuming that $V_1$ is zero. The output of operational amplifier U1 then switches when the voltage at its non-inverting input is also zero. For a +15 volt signal on input 40, this occurs when:

$$V_2/R2 = -15/R3 \quad (1)$$

or, $$V_2 = -15R2/R3 \quad (2)$$

For the component values listed in Table I, the first predetermined threshold voltage $V_{th1}$ is 5 volts. This value is increased by a factor of 7.5 by the filtering action of capacitor C1 which reduces the AC signal level. The capacitor C1 filter eliminates the circuit sensitivity to harmonic content of the input voltages. The resulting threshold voltage is thus 37.5 volts peak, which is equivalent to 25 volts RMS.

Figure 2:
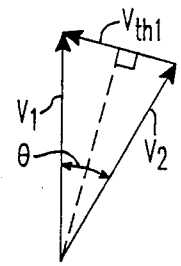
FIG. 2 is a vector diagram of the voltages of the system of FIG. 1.

FIG. 2 illustrates the method of calculating the allowable paralleling angles using the first threshold voltage level and the system voltages. The calculation assumes that $V_1 = V_2 = V_m$. Then, from FIG. 2:

$$\sin\left(\frac{\theta}{2}\right) = \frac{V_{thl}}{2V_m} \quad (3)$$

but for small angles, $$\sin\left(\frac{\theta}{2}\right) \sim \frac{\theta}{2} \quad (4)$$

so, $$\theta \sim \frac{V_{thl}}{V_m} \quad (5)$$

Figure 3:
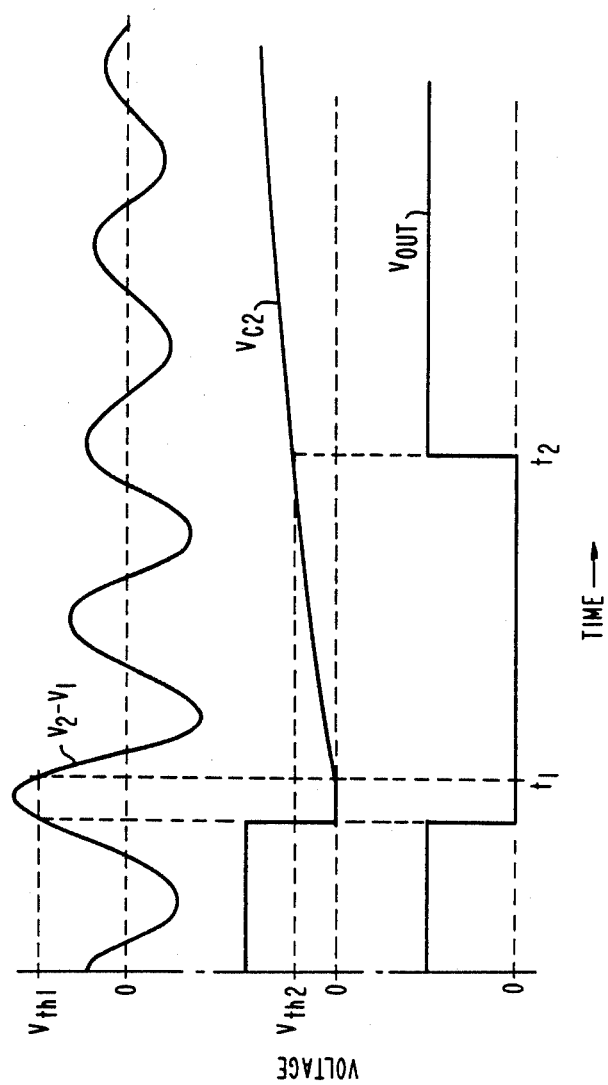
FIG. 3 is a series of waveforms which illustrate the operation of the automatic paralleling system of FIG. 1.

Since the circuit of FIG. 1 was designed for a 250-volt RMS system, $\theta = 0.1$ radians or 6°. FIG. 3 is a series of waveforms which illustrate the response of the circuit of FIG. 1 to varying phase angles between voltages $V_1$ and $V_2$. When the difference voltage $V_2 - V_1$ is above the threshold voltage $V_{th1}$, an output transistor Q1 of comparator U1 is turned on to quickly pull down the voltage $V_{C2}$ on capacitor C2. When the difference $V_2 - V_1$ is below the threshold $V_{th1}$, U1 allows capacitor C2 to charge slowly through resistor R4 with a time constant of about 150 milliseconds for the circuit values shown in Table I. Thus, $V_{C2}$ takes about 100 milliseconds (between times $t_1$ and $t_2$) to reach the second predetermined threshold voltage $V_{th2}$ (7.5 volts). At this point, the output $V_{out}$ of U2 on line 44 goes high to allow the systems to be connected in parallel.

For the component values shown in Table I, the circuit of FIG. 1 requires the two power sources to be within 6° for 100 milliseconds before paralleling is allowed. This means that the slip frequency must be less than 1/6 Hz.

The circuit of FIG. 1 permits easy setting of limits for slip frequency or phase angle by controlling the DC voltage on terminal 40 and by controlling the R4-C2 time constant. If the timing accuracy is not critical, comparator U2 may be replaced by a logic gate.

It should be apparent that the circuit of FIG. 1 performs a method for effecting parallel operation of a pair of alternating current electrical power sources wherein the difference voltage occurring between output voltages on corresponding phases of the power sources are monitored while a capacitor is charged. The capacitor is shorted when the difference voltage occurring between the output voltages on corresponding phases of the power sources exceeds a first predetermined threshold level. Paralleling of the power sources is inhibited when the voltage on the capacitor is below a second predetermined threshold level.

The circuit and method of this invention provide fast response to phase disturbances and protect the electrical system from paralleling at large phase angle differences. The circuit of FIG. 1 provides accurate sensing of phase angle and slip frequency limits without the need for frequent circuit adjustments.

Although the present invention has been described in terms of what is at present believed to be its preferred embodiment, it will be apparent to those skilled in the art that various changes may be made with out departing from the scope of the invention. It is therefore intended that the appended claims cover such changes.

What is claimed is:

1. A system for effecting paralleling operation of a first alternating current electrical power source with a second alternating current electrical power source, said system comprising:

means for monitoring the difference voltage occurring between output voltages on corresponding phases of first and second alternating current electrical power sources;

a capacitor connected to an output of said means for monitoring;

means for charging said capacitor;

said means for monitoring including means for shorting said capacitor when the difference voltage occurring between the output voltages on corresponding phases of said first and second alternating current electrical power sources exceeds a first predetermined threshold level;

control means for effecting the electrical connection of voltage outputs of said first and second electrical power sources; and means for inhibiting said control means until the voltage on said capacitor reaches a second predetermined threshold level.

2. A system for effecting paralleling operation of a first alternating current electrical power source with a second alternating current electrical power source, as recited in claim 1, wherein said means for monitoring comprises:

a differential comparator circuit having three inputs, a first one of said inputs being connected to one phase of said first alternating current electrical power source, a second one of said inputs being connected to one phase of said second alternating current electrical power source, and a third one of said inputs being connected to receive a threshold signal; and said means for shorting including an open collector output circuit having a transistor collector connected to said capacitor and means for turning on said transistor when said difference voltage exceeds said first predetermined threshold level.

3. A system for effecting paralleling operation of a first alternating current electrical power source with a second alternating current electrical power source, as recited in claim 2, wherein said means for inhibiting comprises:

a second comparator for comparing said voltage on said capacitor to said second predetermined threshold level and for producing a paralleling signal when said voltage on said capacitor exceeds said second predetermined threshold level.

4. A method for effecting paralleling operation of a first alternating current electrical power source with a second alternating current electrical power source, said method comprising the steps of:

monitoring a difference voltage occurring between output voltages on corresponding phases of first and second alternating current electrical power sources;

charging a capacitor;

shorting said capacitor when the difference voltage occurring between the output voltages on corresponding phases of said first and second alternating current electrical power sources exceeds a first predetermined threshold level; and inhibiting the electrical connection of voltage outputs of said first and second electrical power sources until the voltage on said capacitor reaches a second predetermined threshold level.

* * * * *